United States Patent [19]

Aftergut et al.

[11] 4,411,812
[45] Oct. 25, 1983

[54] DICHROIC LIQUID CRYSTAL COMPOSITIONS MADE WITH ASYMMETRIC TRIS-AZO DYES

[75] Inventors: Siegfried Aftergut, Schenectady; Herbert S. Cole, Scotia, both of N.Y.

[73] Assignee: General Electric Company, Schenectady, N.Y.

[21] Appl. No.: 320,281

[22] Filed: Nov. 12, 1981

[51] Int. Cl.$^3$ .................... G02F 1/13; C09K 3/34
[52] U.S. Cl. .................... 252/299.1; 350/349
[58] Field of Search ................ 252/299.1; 350/349

[56] References Cited

U.S. PATENT DOCUMENTS

| | | | |
|---|---|---|---|
| 4,122,027 | 10/1978 | Cole, Jr. et al. | 252/299.1 |
| 4,128,479 | 12/1978 | Cole, Jr. et al. | 252/299.1 |
| 4,145,114 | 3/1979 | Coates et al. | 252/299.1 |
| 4,153,343 | 5/1979 | Bloom et al. | 252/299.1 |
| 4,273,929 | 6/1981 | Boller et al. | 252/299.1 |
| 4,278,328 | 7/1981 | Mukoh et al. | 252/299.1 |
| 4,308,161 | 12/1981 | Aftergut et al. | 252/299.1 |
| 4,308,162 | 12/1981 | Cole, Jr. et al. | 252/299.1 |
| 4,308,163 | 12/1981 | Aftergut et al. | 252/299.1 |
| 4,350,603 | 9/1982 | Aftergut et al. | 252/299.1 |
| 4,359,398 | 11/1982 | Cole, Jr. et al. | 252/299.1 |

FOREIGN PATENT DOCUMENTS

| | | | |
|---|---|---|---|
| 53-26783 | 3/1978 | Japan | 252/299.1 |
| 53-82675 | 7/1978 | Japan | 252/299.1 |
| 53-89894 | 8/1978 | Japan | 252/299.1 |
| 54-68780 | 6/1979 | Japan | 252/299.1 |
| 56-57850 | 5/1981 | Japan | 252/299.1 |
| 2090274 | 7/1982 | United Kingdom | 252/299.1 |

OTHER PUBLICATIONS

Jones, F. et al., Mol. Cryst. Liq. Cryst., vol. 60, pp. 99–110 (1980).
Cognard, J. et al., Mol. Cryst. Liq. Cryst., vol. 68, pp. 207–229 (1981).
Cox, R. J., Mol. Cryst. Liq. Cryst., vol. 55, pp. 1–32 (1979).
White, D. L. et al., J. Appl. Phys., vol. 45, No. 11, pp. 4718–4723 (1974).
Bloom, A. et al., Mol. Cryst. Liq. Cryst., vol. 40, pp. 213–221 (1977).

*Primary Examiner*—Teddy S. Gron
*Attorney, Agent, or Firm*—William A. Teoli; James C. Davis, Jr.; James Magee, Jr.

[57] ABSTRACT

Novel asymmetric tris-azo dye compositions and a liquid crystal composition containing the asymmetric tris-azo dye compositions are disclosed. The asymmetric dye compositions having asymmetric terminal groups have the general formula:

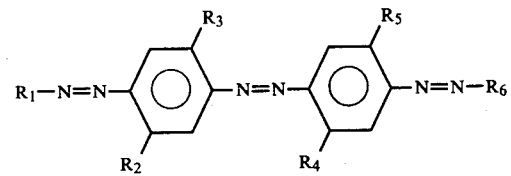

wherein $R_1$ is one of the three following groups:

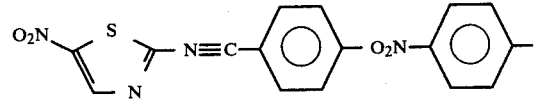

5-nitrothiazolyl group, 4-cyanophenyl group, and 4-nitrophenyl; wherein $R_2$, $R_3$, $R_4$ and $R_5$ are selected from the group consisting of hydrogen, alkyl, halogen and alkoxy, and $R_6$ is selected from the group consisting of N,N-diethylamino-3-methylphenyl; N,N-diethylamino-3-methylphenyl; N,N-diethylamino-3,5-dimethylphenyl; 2-pentylperimidyl; N-ethylamino-1-naphthyl; N,N-dimethylamino-1-naphthyl; and N,N-diethylamino-1-naphthyl. When the asymmetric tris-azo dichroic dyes are used as a guest in a host liquid crystal material, they form a novel liquid crystal composition for use in liquid crystal displays.

7 Claims, No Drawings

DICHROIC LIQUID CRYSTAL COMPOSITIONS MADE WITH ASYMMETRIC TRIS-AZO DYES

This invention relates to asymmetric tris-azo dye compositions and more particularly, to dichroic liquid crystal compositions containing the asymmetric tris-azo dyes.

Dyes having improved properties are desirable for various applications, including the dyeing of textiles, the coloring of plastics and the coloring of liquid crystal displays. Among those properties which are desirable for dyes, especially for dyes used in liquid crystal displays, are photostability of the dye, suitable extinction coefficient of the dye, solubility of the dye in liquid crystal hosts, orientability of the dye in liquid crystal hosts and light absorption in the desired spectral region. In liquid crystal displays, certain colors of dyes are especially useful for modifying the color of other dyes or as additives for black dichroic dye formulations and the like. Thus, it is particularly important to provide dyes which have maximum light absorption at certain wavelengths in order to modify appropriately a color of a dye or as an additive for black dichroic dye formulations, especially those to be used in liquid crystal displays. To obtain the desired light absorption at a particular wavelength, or to obtain maximum absorption at a particular wavelength, it is often desirable ot modify dye molecules so that there is maximum absorption of light radiation at a particular wavelength or at a number of wavelengths in the case of mixtures of dyes. This is preferably accomplished without decreasing the solubility of the dye, especially the solubility of the dye in a liquid crystal formulation and without significant impact upon other desirable properties of the dyes used in liquid crystal displays. Since all known trisazo dyes have some degree of instability when exposed to light in the 350-700 nm wavelength region, and since substantially none of these dyes have the peak of their absorption band in the 625-700 nm range required for making outstanding blue and black displays, it is desirable to improve the tris-azo dyes by modifying the dye molecules so that the stability of the dye is improved when exposed to light and/or so that such dyes have an absorption band above 600 nm and preferably in the 625-700 nm range without compromising the solubility of the dye in a liquid crystal formulation.

The fabrication of black liquid crystal displays poses a particular problem in that no black dichroic dyes are known, and black liquid crystal displays are made by mixing dichroic dyes of various colors in proper proportions to obtain a material which absorbs light radiation in the spectral range of about 400-700 nm resulting substantially in a black color. Thus, improved tris-azo dyes which are soluble in liquid crystal formulations and which have the peak of their absorption band above 600 nm and preferably in the 625-700 nm range, are desired to improve the black color by shifting the wavelength of maximum absorption of tris-azo dyes to a longer wavelength. The shift, known as a bathochromic shift, can result in a more saturated color, and preferably produces dyes having the peak of their absorption band at the 625 nm wavelength or higher, and when intensity and greater contrast are required, it is desirable to achieve more soluble dyes having more saturated color at the longer wavelength. In the case of the black dichroic formulations for liquid crystal displays, it is desirable to provide more saturated blue colors. Thus, for the black formulations, an increase in the peak of the absorption band is important at the 600 nm end of the spectrum because there are few suitable dichroic dyes having a maximum absorption above 600 nm which are soluble in liquid crystal host materials, and there are substantially no dyes which have the peak of their absorption band in the 625-700 nm range, and which have other desirable properties for use in formulations used in liquid crystal displays. Many of the prior art dyes, e.g., the ionic dyes, having a maximum absorption of light radiation above 600 nm are insoluble in liquid crystal formulations and cannot be used to color such displays.

Tris-azo dichroic dyes having three azo (—N≡N—) bonding groups and having suitable order parameters, (S), greater than 0.70 are disclosed in the prior art with various terminal groups and other substituted groups to improve the properties of the dyes for use in liquid crystal displays. For example, tris-azo dyes having various terminal groups and other substituted groups are disclosed in U.S. Pat. No. 4,122,027, U.S. Pat. No. 4,128,497 and U.S. Pat. No. 4,145,114.

In U.S. Pat. No. 4,122,027, high order parameter dichroic dyes having three azo bonding groups are disclosed for use in liquid crystal displays. The dichroic dyes of U.S. Pat. No. 4,122,027 are of the 4,4'-bis-(substituted naphthylazo)azobenzene type, having various aromatic amine terminal groups. The high order parameter dichroic dyes in U.S. Pat. No. 4,122,027 have the following generic chemical formula:

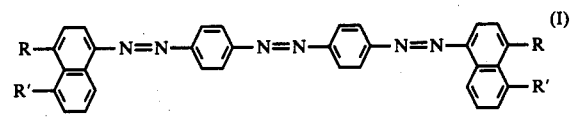

wherein R and R' are selected from (among others) the substituents in the following Table:

| Dye | R | R' | S | λ Max. (Approx.) | Color |
|---|---|---|---|---|---|
| 1 | N(CH$_3$)$_2$ | H | 0.74 | 555 | Violet |
| 2 | NHCH$_3$ | H | 0.75 | 595 | Blue |
| 3 | NHC$_2$H$_5$ | H | 0.72 | 598 | Blue |
| 4 | NH$_2$ | H | 0.74 | 580 | Purple |
| 5 | NH$_2$ | NH$_2$ | 0.74 | 595 | Blue |
| 6 | H—N\_C(CH$_3$)(C$_2$H$_5$)\_N—H | | 0.72 | 610 | Deep Blue |
| 7 | H—N\_C(cyclohexyl)\_N—H | | 0.72 | 605 | Deep Blue |

The order parameters (S), maximum attenuation wavelength (λmax.), and color are shown for each of the respective dyes of prior art formula (I) illustrated above. Although the foregoing dyes of U.S. Pat. No. 4,122,027 are suitable for coloring liquid crystal mixtures and have adequate properties, e.g., solubility for use in liquid crystal displays, it is always desirable to improve those properties and to provide azo dyes having more intense or saturated colors, especially at wavelengths over 600 nm.

Another class of dichroic liquid crystal compositions in which are dissolved a group of high order parameter dichroic dyes, each having five azo bonding groups (penta-azo dyes), are disclosed in U.S. Pat. No. 4,128,497. The terminal groups of the penta-azo dyes of U.S. Pat. No. 4,128,497 include dihydroperimidine terminal groups, n-ethyl-1-naphthyl terminal groups, N,N-dimethyl-1-phenyl, N-methyl-1-naphthyl and the like. Although the dyes of U.S. Pat. No. 4,128,497 can be dissolved in liquid crystal compositions to form liquid crystal displays of suitable colors, and although they embrace a somewhat broad spectrum of maximum absorption wavelength over the range from about 590 nm to about 620 nm, whereby a display having a blue-black color may be fabricated, it is always desirable to improve the colors of dichroic dyes used in liquid crystal compositions, especially to provide dyes having a maximum absorption band which lies at longer wavelengths, and thereby provide more saturated colors, especially more saturated blue colors, without sacrifice of solubility of the dye in the liquid crystal, and preferably increasing the solubility of the dye in the liquid crystal composition.

In U.S. Pat. No. 4,145,114, a substantial number of dye compounds are proposed for use in liquid crystal materials, including tris-azo dyes having terminal aromatic amine groups, such as N,N-dimethyl-1-xylyl and N,N-diethylamino-1-(3-methylphenyl). Although numerous pleochroic dyes are proposed in U.S. Pat. No. 4,145,114, it is always desirable to improve azo dyes and to improve liquid crystal displays containing azo dyes.

A blue asymmetrical monoazo dichroic dye having the following formula:

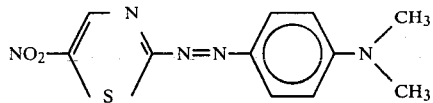

is disclosed in a paper entitled "Pleochroic Dyes With High-Order Parameters for Liquid Crystal Displays" at page 514 of ELECTRONICS LETTERS, Volume 12, No. 20 (Sept. 30, 1976). Dichroic azo dyes having 5-nitrothiazolyl, 4-cyanophenyl, various aromatic groups and perimidine terminal groups are disclosed in "New Absorptive Mode Reflective-Crystal Display Device" at page 4719 of J.APPL. Phys., Volume 45, No. 11, November, 1974. Perimidine is also used as a terminal group on azo dyes in U.S. Pat. No. 3,960,751 and U.S. Pat. No. 4,179,395. Although many types of aromatic amines have been used as terminal groups upon azo dyes, it is always desirable to improve the azo dyes and to improve liquid crystal displays containing azo dyes.

Accordingly, it is the primary object of the present invention to provide tris-azo dyes having a novel chemical composition.

It is another object of the present invention to provide novel liquid crystal compositions for use in liquid crystal displays.

Another object of the present invention is to provide tris-azo dyes having improved properties without sacrificing the solubility of the dyes in liquid crystals.

Another object of the present invention is to provide improved dichroic liquid crystal displays made by mixing dichroic dyes having more saturation at longer wavelengths and improved solubility in the liquid crystal composition.

Yet another object of the present invention is to provide a class of tris-azo dyes, the absorption band of which lies at longer wavelengths to yield more saturated blue colors.

Another object of this invention is to provide improved black dichroic liquid crystal displays made by mixing dichroic dyes of various colors and to provide a method of improving the black color of dichroic dyes used in black liquid crystal displays.

Other objects and advantages of the invention will become apparent as the description thereof proceeds.

These and other objects of the invention can be achieved by providing tris-azo dyes having the general formula:

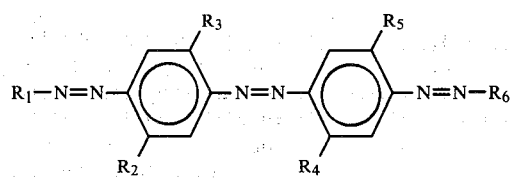

wherein $R_1$ is selected from the group of radicals consisting of:

5-nitrothiazolyl (1)

4-cyanophenyl (2)

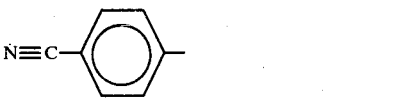

4-nitrophenyl (3)

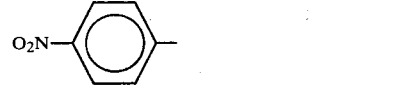

$R_2$, $R_3$, $R_4$ and $R_5$ are selected from the group consisting of hydrogen, halogen, alkyl and alkoxy, and $R_6$ is selected from the group of radicals consisting of:

N,N—diethylamino-3-methylphenyl (1)

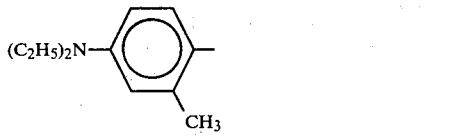

N,N—diethylamino-3,5-dimethylphenyl (2)

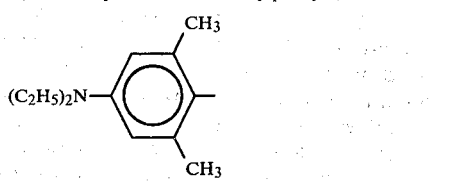

-continued 2-pentyl-6-perimidyl (3)

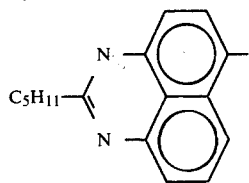

N—ethylamino-1-naphthyl (4)

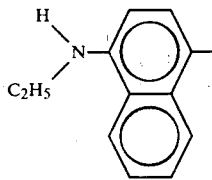

N,N—dimethylamino-1-naphthyl, and (5)

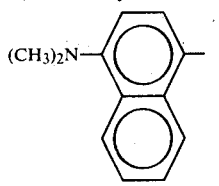

N,N—diethylamino-1-naphthyl (6)

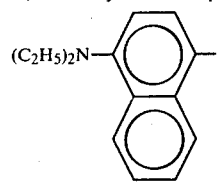

The foregoing terminal groups are illustrated in the form of the organic radical. The terminal groups illustrated above are linked to or joined at the azo groups of the dye molecule by a bond in the para-position of the terminal group.

In accordance with the present invention $R_1$ terminal groups and $R_6$ terminal group upon the same tris-azo dye molecule differ, $R_1$ representing a nitrothiazolyl group, a cyanophenyl group or a nitrophenyl group, and $R_6$ representing one of the specified aromatic amines.

The foregoing asymmetrical tris-azo dyes, that is, dyes having two different terminal groups, have three azo (—N≡N—) linking groups, one of the azo linking groups (the central azo groups) joining two benzene rings which are unsubstituted or substituted with halogen, alkyl and/or alkoxy groups in the 2-position and/or the 5-position. The other two azo groups join the unsubstituted or substituted benzene rings to two different terminal groups at the para-position. The terminal groups are designated as $R_1$ and $R_6$ in the general formula of the tris-azo dyes of this invention. The specific terminal groups have been specified above.

The terminal groups, designated by $R_1$ and $R_6$ in the general dye formula, are auxochromes, i.e., electron-withdrawing groups or electron repelling groups. The terminal groups of the class of dyes described herein generally produce a bathochromic shift when they are present upon the dye molecule having the three azo groups connecting the substituted and/or unsubstituted benzene rings and the terminal groups as discussed above. This bathochromic shift is particularly important for dyes, the absorption band of which lies at longer wavelengths, for example, those wavelengths approaching 600 nm and above, because the shift in that wavelength region yields more saturated blue colors.

In accordance with the present invention, there is also provided a liquid crystal composition for use in a liquid crystal display, comprising, a host liquid crystal material; and a guest dye dissolved in the host liquid material, the dye having the general formula and the preferred terminal groups and unsubstituted or substituted benzene rings as specified in the general formula of the asymmetric dyes of the present invention. The unique and novel class of asymmetric tris-azo dyes (dyes having 3 azo groups) of the present invention must have two different terminal groups attached to two of the azo linking groups of the dye molecule. It is the synergism or interaction between the two different terminal groups upon the azo linkages of the dye molecule and the particular configuration of the unsubstituted or substituted benzene rings which results in the improved tris-azo dyes of the present invention and the improved liquid crystal composition for use in a liquid crystal display comprising a host liquid crystal material and the improved guest dichroic dyes of the present invention.

These and various other objects, features and advantages of the invention can be best understood from the following detailed description.

Three different classes of asymmetrical tris-azo dyes or guest asymmetrical, dichroic tris-azo dyes of the present invention can be synthesized by a reaction which produces the improved dye molecules having a relatively elongated and rigid molecular structure.

The first class of improved asymmetrical tris-azo dyes or guest asymmetrical, dichroic tris-azo dyes of the present invention have the following general formula:

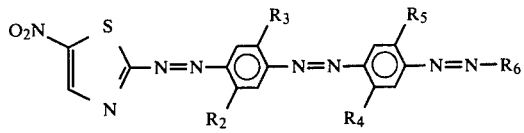

wherein $R_2$, $R_3$, $R_4$ and $R_5$ are selected from the group consisting of hydrogen, halogen, alkyl and alkoxy, and $R_6$ is selected from the group of radicals consisting of N,N-diethylamino-3-methylphenyl; N,N-diethylamino-3,5-dimethylphenyl; 2-pentylperimidyl; N-ethylamino-1-naphthyl; N,N-dimethylamino-1-naphthyl; and N,N-diethylamino-1-naphthyl.

In accordance with the present invention, $R_2$, $R_3$, $R_4$ and $R_5$ may be the same or they may differ and consist of any combination and permutation of hydrogen, halogen, alkyl and alkoxy. For example, $R_2$, $R_3$, $R_4$ and $R_5$ may all be methyl, or $R_2$ may be methyl, $R_3$ may be methoxy, $R_4$ may be methyl and $R_5$ may be methoxy, and the like.

Another preferred class of asymmetrical tris-azo dyes or guest asymmetrical, dichroic tris-azo dyes of the present invention can be synthesized by a reaction which produces the following general formula:

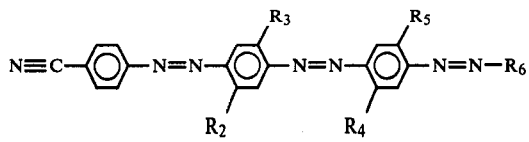

wherein $R_2$, $R_3$, $R_4$, $R_5$ and $R_6$ are the same as those described above for this invention. Furthermore, $R_2$, $R_3$, $R_4$ and $R_5$ may be the same entity or may be different entities as described above.

Still another preferred class of asymmetrical tris-azo dyes, or guest asymmetrical, dichroic tris-azo dyes of the present invention can be synthesized by a reaction which produces the following general formula:

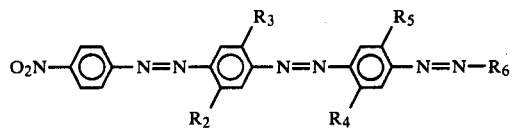

wherein $R_2$, $R_3$, $R_4$, $R_5$ and $R_6$ are the same as described above for this invention, and wherein $R_2$, $R_3$, $R_4$, and $R_5$ may be the same entity or may be different entities.

As used herein alkyl group is preferably methyl or ethyl; alkoxy is preferably methoxy or ethoxy; and halogen is preferably chlorine or bromine.

The asymmetrical tris-azo dyes can be synthesized by several well-known prior art procedures. A typical reaction sequence in the preparation of the asymmetrical tris-azo dyes of the present invention is shown below, however, other sequences or other types of reactions can also be employed as will be obvious to those skilled in the art. Techniques and reaction conditions for carrying out the diazotization and coupling reactions can also be varied and optimized as desired.

EXEMPLARY REACTION SEQUENCE

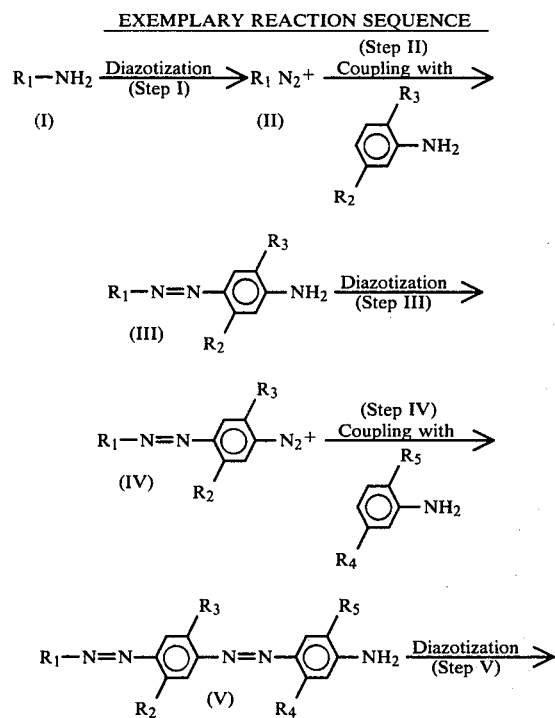

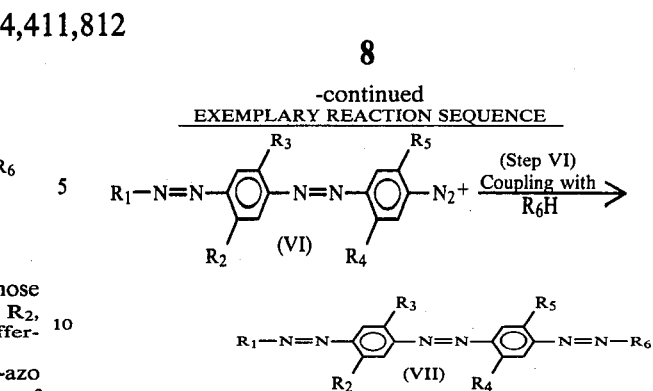

In the foregoing reaction sequence, $R_1$, $R_2$, $R_3$, $R_4$, $R_5$ and $R_6$ are the same as described above for this invention.

The starting material, represented generically by (I) in the reaction sequence above, may be 2-amino-5-nitrothiazole, 1-amino-4-cyanobenzene or 1-amino-4-nitrobenzene. The following numerals refer to the exemplary reaction sequence illustrated above. Starting material (I) is diazotized in step (I) by dissolving the starting material (I) in dilute hydrochloric acid. The solution is cooled, for example, to about 0°–5° C., and a solution of sodium nitrite in water is added dropwise to the cooled hydrochloric acid solution to form the diazonium salt (II). For the diazotization step (step I), 1.0 mole of sodium nitrite is added per mole of starting material (I). During step (I), the mixture is stirred at the cooled temperature, e.g., about 0°–5° C., for about 2–4 hours, and excess nitrous acid is destroyed by the addition of a suitable agent, e.g., urea. The resulting diazonium salt (II) is then filtered and added dropwise with stirring to a solution of the appropriate coupling agent in step (II) outlined above. In step (II), the aromatic amine or substituted aromatic amine is dissolved in acetic acid or other suitable solvent, and the diazonium salt (II) is added dropwise with stirring to the solution of the coupling agent, and the reaction mixture is stirred for about 0.5 to about 2.0 hours at a low temperature, e.g., about 5° C. to about 25° C. The product (III) is isolated by diluting the mixture with water and neutralizing the mixture with potassium carbonate. The precipitate formed thereby is collected. The precipitate, product (III), may be recrystallized from pyridine or any other suitable solvent. However, since the pure form of product (III) is not required, when product (III) is used as an intermediate in the sequence outlined above, recrystallization of the product is not generally necessary. Product (III) is diazotized in step (III) to form diazonium salt (IV). Diazotization step (III) is carried out by dissolving product (III) in dilute hydrochloric acid, and the solution is cooled, for example, to about 0°–5° C. A solution of sodium nitrite in water is added dropwise to the cooled hydrochloric acid solution. For the diazotization step (step III), 1.0 mole of sodium nitrite is added per mole of the product (III), being diazotized. After stirring the mixture at the cooled temperature, e.g., at about 0°–5° C. for about 2–4 hours, excess nitrous acid is destroyed by the addition of a suitable agent, e.g., urea. The resulting diazonium salt (IV) is then filtered. Filtered diazonium salt (IV) is then coupled in step (IV) with the appropriate coupling agent, an aromatic amine or a substituted aromatic amine. Coupling step (IV) is carried out by dissolving the aromatic amine or substituted aromatic amine in acetic acid or other suitable solvent, and diazonium salt (IV) is added dropwise with stirring for about 0.5–2.0 hours at a low temperature, e.g., about 5° C. to about 25° C. The product (V) is isolated by diluting the mixture with water, neutralizing the mixture with potassium carbonate and collecting the precipitate. The precipitate, product (V) may be used directly, or it may be recrystallized to a purer form by using pyridine or other suitable solvent. Since product (V) is used as an intermediate, it is not generally necessary to recrystallize the precipitate. Product (V) is diazotized in step (V) to form a diazonium salt (VI). The diazotization is carried out as described in the other steps above by dissolving product (V) in dilute hydrochloric acid and cooling the solution, for example, to about 0° to about 5° C. A solution of sodium nitrite in water is added dropwise to the cooled hydrochloric acid solution of product (V). One mole of sodium nitrite is used for each mole of product (V) in diazotization step (V). After stirring the mixture at the cooled temperature, e.g., about 0° to about 5° C. for about 2–4 hours, excess nitrous acid is destroyed by the addition of a suitable agent, e.g., urea. The resulting diazonium salt (VI) is then filtered and added dropwise with stirring to a solution of the appropriate coupling agent dissolved in acetic acid or other suitable solvent in coupling step (VI). The coupling agent used in step (VI) is N,N-diethylamino-3-methylbenzene; N,N-diethylamino-3,5-dimethylbenzene; 2-pentylperimidine; N-ethylamino-1-naphthalene; N,N-dimethylamino-1-naphthalene; or N,N-diethylamino-1-naphthalene. One of the foregoing coupling agents is dissolved in acetic acid or other suitable solvent in coupling step (VI), and the diazonium salt (VI) is added dropwise with stirring thereto. The reaction mixture is stirred for about 0.5–2 hours at a low temperature, e.g., about 5° C. to about 25° C. The asymmetrical tris-azo dye of the present invention (VII) is isolated by diluting the mixture with water, neutralizing with potassium carbonate and collecting the precipitate. The asymmetrical tris-azo dye product (VII) may be recrystallized from pyridine or other suitable solvent to improve the purity of the dye.

Naturally, other agents, solvents, neutralizers, adjuvants and recrystallization techniques can be substituted by one skilled in the art. Furthermore, optimum reaction conditions and temperatures can also be chosen by one skilled in the art without undue experimentation. $R_2$, $R_3$, $R_4$ and $R_5$ may be any one or a combination of hydrogen; alkyl such as methyl; halogen, such as, chlorine or bromine; and alkoxy, such as, methoxy. In the process outlined above, the $R_2$, $R_3$, $R_4$ and $R_5$ groups are substituted upon the appropriate coupling agents (aromatic amines) in step (II) and step (IV) respectively. In accordance with the present invention, the coupling agents used in step (II) and step (IV) may be the same, or they may be different. For example, the coupling agent in step (II) may be 2,5-dimethylaniline, and the coupling agent in step (IV) may be 2,5-dimethylaniline, or the coupling agent in step (II) may be m-toluidine, and the coupling agent in step (IV) may be 3-methoxyaniline. As explained above, the coupling agent used in step (VI) is different from the coupling agents used in step (II) and step (IV) in the reaction sequence outlined above.

The asymmetrical tris-azo dyes prepared in accordance with this invention can be used in any conventional manner. For example, they can be used alone or in combination with other dyes, modifiers or adjuvants to dye textiles (natural or man-made fibers) or to color plastic materials, and the like. The asymmetrical tris-azo dyes can be used alone or in combination with other dyes, modifiers or adjuvants to color liquid crystal displays. In preferred embodiments, the asymmetrical tris-azo dyes are used with liquid crystal host materials well-known in the art to improve the color of the liquid crystal composition for use in a liquid crystal display. When the asymmetrical tris-azo dyes of this invention are used with a liquid crystal host, they are called guest dyes, and they are dissolved in the host liquid crystal material, that is, the guest asymmetrical tris-azo dye is soluble in the host liquid crystal material.

Any liquid crystal host material may be used in accordance with the present invention. In those embodiments of the present invention wherein the asymmetrical tris-azo dichroic dye material is used as a guest dye in a host liquid crystal material, it is not critical which of the many well-known liquid crystal materials or combinations thereof may be used as long as the asymmetrical tris-azo dye materials of the present invention are soluble in the host liquid crystal material and as long as the asymmetrical tris-azo dye or dyes of the present invention are compatible with or have no adverse effect upon the host liquid crystal material. In preferred liquid crystal compositions of the present invention, the host liquid crystal material is a nematic liquid crystal of positive or negative dielectric anisotropy, a cholesteric liquid crystal of positive or negative dielectric anisotropy and mixtures thereof, that is, mixtures of nematic liquid crystals and cholesteric liquid crystals modified with other optically active compounds.

Any conventional liquid crystal host material can be used with the asymmetrical tris-azo dyes of the present invention. The liquid crystal hosts can be selected by one skilled in the art depending upon the electro-optic effect to be utilized. Nematic liquid crystals include biphenyl liquid crystals such as E-7 and E-8 from BDH, Ltd.

Biphenyl liquid crystal E-7 is a eutectic of the following general formula:

wherein R is a mixture of $C_5H_{11}$, $C_7H_{15}$, $C_8H_{17}O$ and

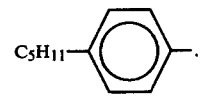

Other nematic liquid crystals include phenylcyclohexanes, cyclohexylcyclohexanes, phenylpyrimidines and esters available from E. Merck Associates and Hoffman-LaRoche C.

In accordance with the present invention, it is not critical how much of the dye is present in the host liquid crystal as long as the dye is soluble therein. In preferred embodiments, about 0.05% by weight to about 1.0% by weight, and more preferably, greater than about 0.5% by weight, (based upon the weight of the liquid crystal host material) of the dye of this invention or mixtures of dyes of this invention are present in the host liquid crystal. One skilled in the art can adjust the amount of asymmetrical tris-azo dye as desired and can determine the amount required for maximum absorption at a particular wavelength. The upper limit of the amount (concentration) of dye varies with the solubility of the particular dye within the host liquid crystal. The amount of guest asymmetrical, dichroic tris-azo dye of the present invention in the host liquid crystal material is that amount up to the limit of maximum solubility in the host of asymmetrical tris-azo dye required to color, tint, or shade the host liquid crystal, required to add to the color of the host liquid crystal material, or required to contribute to the color of a mixture of dyes used in the host liquid crystal material.

We claim:
1. A liquid crystal composition for use in a liquid crystal display, comprising:
a host liquid crystal material; and
a guest tris-azo dichroic dye dissolved in said host liquid crystal material, said dichroic dye having a 5-nitrothiazolyl terminal group and the general formula,

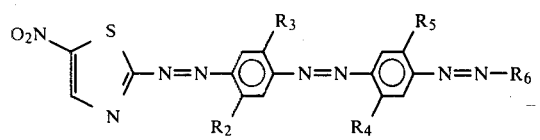

wherein $R_2$, $R_3$, $R_4$ and $R_5$, are selected from the group consisting of hydrogen, alkyl halogen and alkoxy, and $R_6$ is selected from the group consisting of

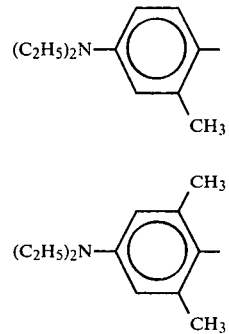

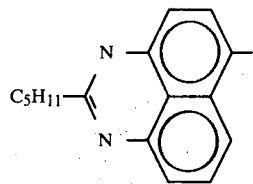

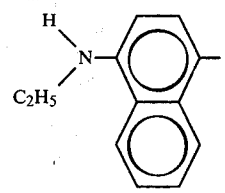

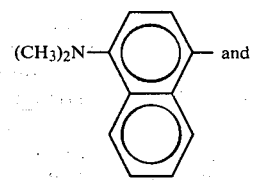 and

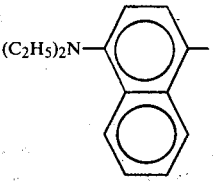

2. The liquid crystal composition of claim 1, wherein $R_2=R_3=R_4=R_5$.
3. The liquid crystal composition of claim 1, wherein about 0.05% by weight to about 1.0% by weight (based upon the weight of the liquid crystal) of the guest dichroic dye is dissolved in the host liquid crystal.
4. The liquid crystal composition of claim 1, wherein the host material is a nematic liquid crystal of positive or negative dielectric anisotropy, a cholesteric liquid crystal of positive or negative dielectric anisotropy and mixtures thereof or any of the foregoing modified with other optically active compounds.
5. The liquid crystal composition of claim 1, wherein the alkyl is methyl.
6. The liquid crystal composition of claim 1, wherein the alkoxy is methoxy.
7. The liquid crystal composition of claim 1, wherein the halogen is selected from the group consisting of chlorine and bromine.

* * * * *